United States Patent
Sampang et al.

(10) Patent No.: US 8,185,606 B2
(45) Date of Patent: May 22, 2012

(54) EMAIL CHANGE TRACKING

(75) Inventors: Jerome Gualberto Sampang, Bukit Panjang (SG); Ronny Syarif, Bishan (SG); Helen Tandiono, Tanglin (SG)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 11/955,123

(22) Filed: Dec. 12, 2007

(65) Prior Publication Data
US 2009/0157820 A1    Jun. 18, 2009

(51) Int. Cl.
    *G06F 15/16* (2006.01)
(52) U.S. Cl. ....................................................... 709/217
(58) Field of Classification Search .................. 709/217, 709/219
    See application file for complete search history.

(56) References Cited

U.S. PATENT DOCUMENTS

| | | | |
|---|---|---|---|
| 6,535,586 B1 * | 3/2003 | Cloutier et al. ............ 379/88.13 |
| 6,704,772 B1 * | 3/2004 | Ahmed et al. ................ 709/207 |
| 7,222,156 B2 | 5/2007 | Gupta et al. |
| 7,222,299 B1 * | 5/2007 | Lim et al. ...................... 715/273 |
| 2002/0073157 A1 * | 6/2002 | Newman et al. ............. 709/206 |
| 2004/0019611 A1 * | 1/2004 | Pearse et al. ............... 707/104.1 |
| 2004/0049543 A1 * | 3/2004 | Kaminsky et al. ........... 709/204 |
| 2004/0073616 A1 | 4/2004 | Fellenstein et al. |
| 2004/0168132 A1 * | 8/2004 | Travieso et al. ............. 715/536 |
| 2005/0160355 A1 * | 7/2005 | Cragun et al. ................ 715/512 |
| 2005/0262206 A1 * | 11/2005 | Weir et al. .................... 709/206 |
| 2006/0100995 A1 * | 5/2006 | Albornoz et al. ................. 707/3 |
| 2006/0101328 A1 * | 5/2006 | Albornoz et al. ............ 715/512 |
| 2006/0105753 A1 * | 5/2006 | Bocking et al. .............. 455/417 |
| 2006/0168025 A1 * | 7/2006 | Jain ............................... 709/206 |
| 2007/0027954 A1 * | 2/2007 | Chen et al. ................... 709/206 |
| 2007/0055926 A1 * | 3/2007 | Christiansen et al. ........ 715/512 |
| 2007/0239831 A1 * | 10/2007 | Basu ............................. 709/206 |
| 2007/0282956 A1 * | 12/2007 | Staats ........................... 709/206 |
| 2008/0307513 A1 * | 12/2008 | Chow et al. ....................... 726/5 |

FOREIGN PATENT DOCUMENTS

WO    2005024578 A2    3/2005

OTHER PUBLICATIONS

"Annotation-Based Web Content Transcoding", Masahiro Hori et al., Dec. 5, 2006.*
"Bells & Whistles for Outlook—Using the Outlook add-in to set a default email format on email replies", pp. 1-2, retrieved Oct. 17, 2007 http://www.emailaddressmanager.com/outlook/format.html.
"To change the look of Microsoft Outlook replies", pp. 1-3, retrieved Oct. 16, 2007 http://www.sipstick.com/maill/olreply1.htm.
"OLEXP: How to Change Reply Font and Line Color in Outlook Express", 1 page, retrieved Oct. 16, 2007 http://support.microsoft.com/kb/174501.

* cited by examiner

*Primary Examiner* — Jeffrey Pwu
*Assistant Examiner* — Scott M Sciacca
(74) *Attorney, Agent, or Firm* — Yee & Associates, P.C.; Steven L. Bennett

(57) ABSTRACT

Illustrative embodiments provide a computer implemented method, an apparatus and a computer program product for email change tracking. In an illustrative embodiment the computer implemented method comprises receiving an email having an annotation defining an annotated portion within the email to form a received email. The received email is parsed with a first parser, the first parser capable of ignoring the annotated portion to form a parsed first portion and a second parser capable of parsing the annotated portion to form a parsed annotated portion. The first parsed portion and parsed annotated portion are each processed to form a respective result which is combined and displayed, indicating changes to a user.

20 Claims, 4 Drawing Sheets

FIG. 4

```
<input type = "hidden" name = "requested item" value = "something.html"/>
  402        404   406                              408
```

FIG. 5

```
<HTML>
...
<BODY>
The quick brown fox <!--<add>--->is<!--</add>--->jump<!--<del>s</del>--><!--<add>--->ing<!--</add>---> over the lazy dog
</BODY>
</HTML>

<!--<add>--->
<!--</add>--->
<!--<del>s</del>-->
<!--<add>--->
<!--</add>--
```

510 — First addition, word "is"
512 — Delete letter "s"
514 — Second addition, ending "ing"

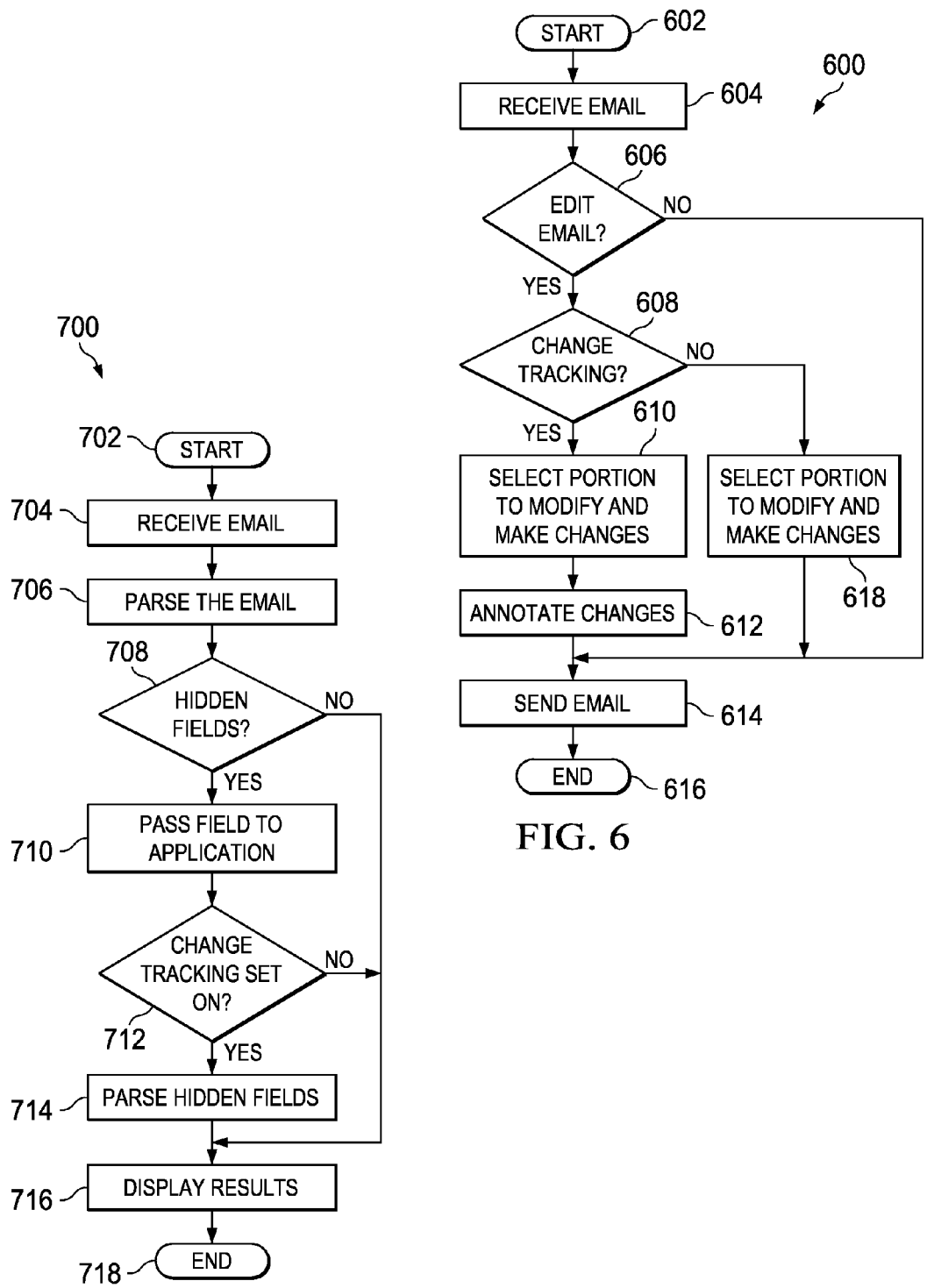

EMAIL CHANGE TRACKING

BACKGROUND OF THE INVENTION

1. Field of the Invention

The present invention relates generally to an improved data processing system and in particular to a method and apparatus for managing email. Still more particularly, the present invention relates to a computer implemented method, an apparatus and a computer program product for email change tracking.

2. Description of the Related Art

Electronic mail has become a primary communication medium for many businesses and home users. Electronic mail is also referred to as email. Email has become relatively inexpensive to use and reliable with the delivery of emails taking significantly less time than traditional postal messages.

Although email began as a relatively informal means of communicating, a stronger dependency upon email usage has occurred. Businesses increasingly rely on the constant flow of legal and financial documents and messages in the form of email that were sent by traditional means of post and courier, to reduce costs and speed up transaction processing. In conjunction with the increased usage, an increased need is also present to have a sense of security and privacy with respect to the email content. Users do not wish to have email viewed by others, unless authorized, or tampered with unknowingly.

Therefore, it would be advantageous to have a computer implemented method, apparatus, and computer program product for managing email that overcomes the problems described above.

BRIEF SUMMARY OF THE INVENTION

Illustrative embodiments provide a computer implemented method and an apparatus, in the form of a data processing system and a computer program product for email change tracking. In an illustrative embodiment, the computer implemented method receives an email having an annotation defining an annotated portion within the email to form a received email. The received email is parsed with a first parser. This first parser is capable of ignoring the annotated portion to form a parsed first portion and parsing the email with a second parser capable of parsing the annotated portion to form a parsed annotated portion. The computer implemented method also displays the received email, comprising the parsed first portion and the parsed annotated portion indicating changes to a user.

In one embodiment, the data processing system comprises a bus, a memory connected to the bus, a persistent storage connected to the bus, wherein the persistent storage contains computer executable instructions thereon, a display connected to the bus, communications unit connected to the bus, and a processor unit connected to the bus. The processor unit executes the computer executable instructions to receive an email having an annotation defining an annotated portion within the email to form a received email. The processor unit executes the computer executable instructions to further parse the received email with a first parser, the first parser is capable of ignoring the annotated portion to form a parsed first portion and parsing the email with a second parser capable of parsing the annotated portion to form a parsed annotated portion, and display the received email comprising the parsed first portion and the parsed annotated portion indicating changes to a user.

In another embodiment, the computer program product comprises a computer usable recordable type medium containing computer executable program code tangibly embodied thereon, the computer executable program code comprises computer executable program code for receiving an email having an annotation defining an annotated portion within the email to form a received email, computer executable program code for parsing the received email with a first parser, the first parser is capable of ignoring the annotated portion to form a parsed first portion and computer executable program code for parsing the received email with a second parser capable of parsing the annotated portion to form a parsed annotated portion and displaying the received email comprising the parsed first portion and the parsed annotated portion indicating changes to a user.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a typical structure of a tag as may be used in an email in accordance with illustrative embodiments;

FIG. 5 is a portion of an email composed in accordance with illustrative embodiments; and FIG. 6 is a flowchart of editing an email in an email change tracking process in accordance with illustrative embodiments; and FIG. 7, a flowchart of receiving an email in an email change tracking process in accordance with illustrative embodiments is shown.

DETAILED DESCRIPTION OF THE INVENTION

Figure 1:
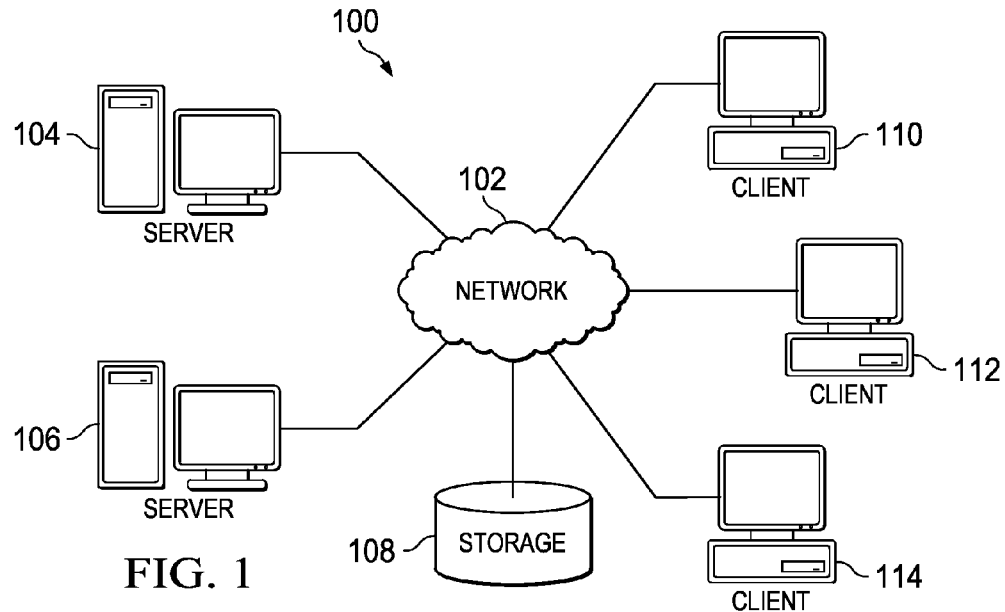
FIG. 1 is a pictorial representation of a network of data processing systems in which illustrative embodiments may be implemented.
Figure 2:
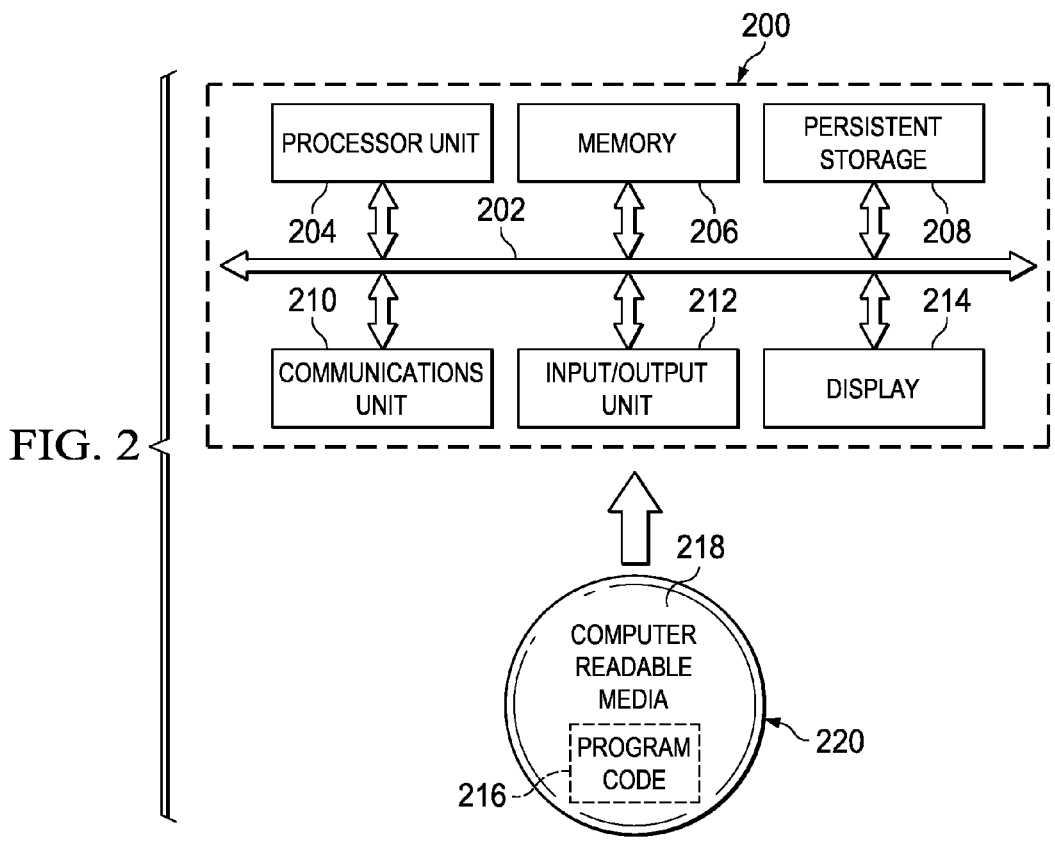
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

In one illustrative embodiment, a computer implemented method for email change tracking receives an email having a modified portion with the modified portion being annotated to form an annotated portion. The email is parsed with a first parser, the first parser capable of ignoring the annotated portion and parsed with a second parser capable of parsing the annotated portion. The result is then displayed to a user, including the annotated portion, indicating changes made to the original email.

For example, with reference to FIG. 1, an email from a user at client 110 may be created and sent through network 102 and an email server, such as server 106, to another user at client 112. The user at client 112 modifies the received email and sends this email to another user at client 114. The user at client 114 selectively enables the email change tracking option in the email client of client 114 and sees the original email from client 110 with changes made by client 112. The email server 106 and browser of each client ignore the annotated portion of the email created by client 112.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
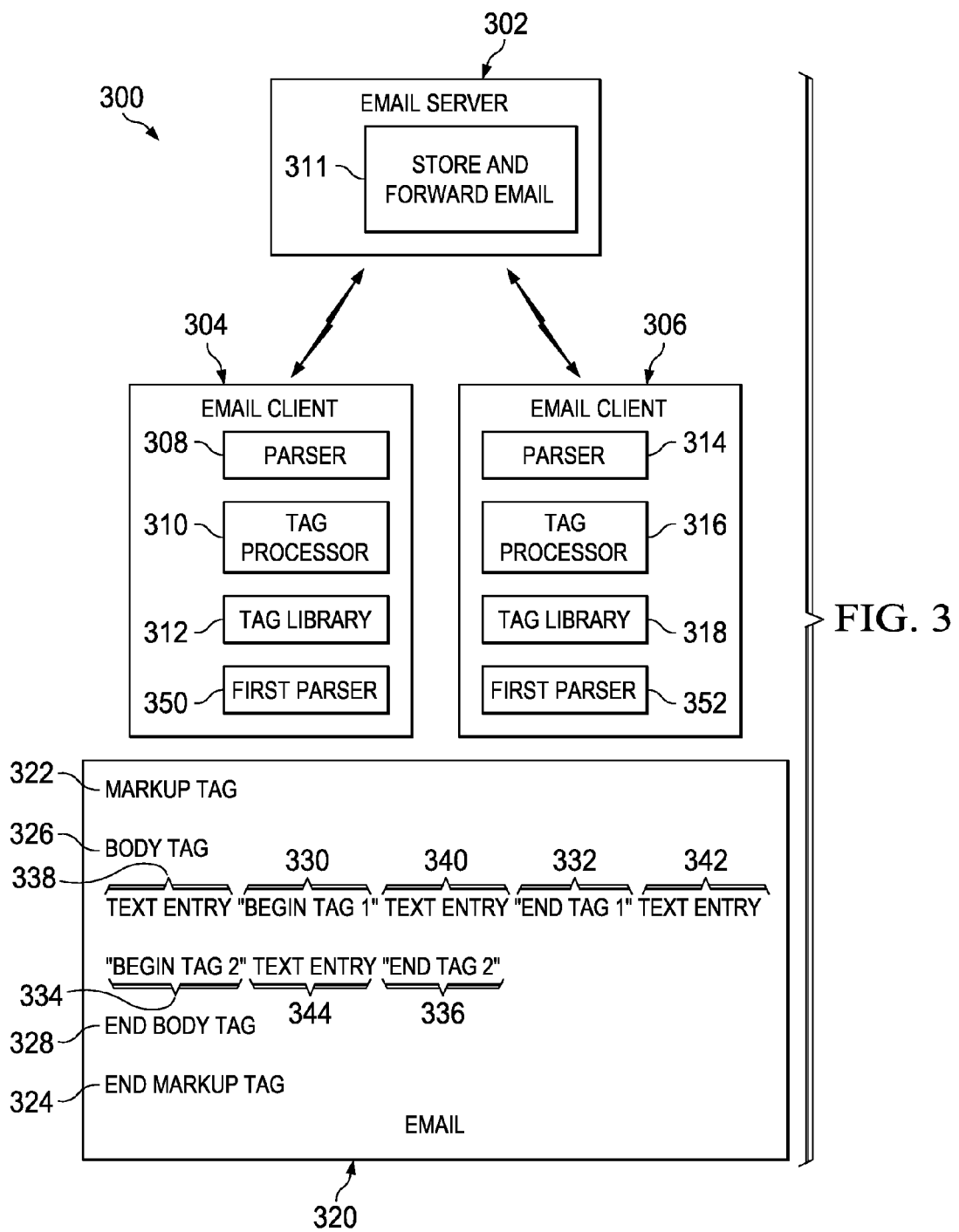
FIG. 3 is a block diagram of an email system and an email, used within the system, in accordance with illustrative embodiments.

With reference now to FIG. 3, a block diagram of an email system in accordance with an illustrative embodiment is shown. Email system 300 comprises an email server 302, as may be implemented on server 106 of FIG. 1 and a set of email clients as may be implemented, such as on clients 110 and 112 of FIG. 1. Email server 302 provides hosting capability for the email system, primarily in the form of a typical store and forward capability 311 for the email between respective clients of the system.

Email client 304 is an example of an email client that may be implemented on a client, such as client 110 of FIG. 1. Email client 304 comprises email client modules, such as is known in the art, but not limited to, parser 308, tag processor 310, and tag library 312. Email client 306 has corresponding modules 314-318 as well, in a similar manner to that of email client 304.

The modules of email client 304 perform email functions specific to the email client application implemented on client 110 in cooperation with email server 302 communicating with other email clients, such as email client 306, in a network of email servers and clients. Other hypertext markup language processing is typically performed by a browser component, of client 110, having a first parser, such as "1$^{st}$ parser" 350 and "1$^{st}$ parser" 352, capable of parsing the typical hypertext markup language tags of the email. Typical email client browser functions process the email headers to format the email in a predefined form, including font usage, color, and layout.

The first parser, such as "1$^{st}$ parser" 350 and "1$^{st}$ parser" 352 is capable of parsing the email 320 received and processing the various hypertext markup language tags, such as markup tag 322, end markup tag 324, body tag 326, end body tag 334 while ignoring application specific tags. The second parser, such as parser 308 and parser 314, are capable of processing the application specific tags of "begin tag 1" 330, "end tag 1" 332, "begin tag 2" 334 and "end tag 2" 336 embedded within the annotated portions of the email to the tag processor 310 and tag processor 316 respectively. Parsers scan the incoming email interpreting tags as processing directives related to the associated text entries as well as structural indicators used to define portions of the email such as a header portion or a body portion. When a parser encounters a tag, the parser requests a tag processor handle the tag and data associated with the tag. The use of a tag is a signal to perform a process according to parameters of the tag on data associated with the tag.

For example, in a header portion it is expected to find protocol information such as that pertaining to a hypertext markup language and transport protocol. The tag for the header would be passed to the usual tag processor to process the header tag according to the instructions for the header tag in the header library along with the associated header data. In a similar manner the body tag would introduce a body portion of the email and provide certain presentation controls for the overall email. In one example a tag may initiate highlighting or specify a color of associated text data. Other tags may be more complex directed to processing or calling other processes or scripts to be performed and then return.

Within the body of the email there may also be application specific tags to further direct processing of the text entries as needed by the application. Application specific tags are passed to an application specific tag processor using an application specific tag library to contain the specific functions of the application.

Parser 308 and parser 314 are examples of application specific parsers. Tag processor 310 and tag processor 316 have the capability of processing tags parsed in email 320. Tag processor 310 works in conjunction with tag library 312 to perform the directives provided by the tags of the email. Tag processor 316 works in a similar manner with tag library 318. Typical tags direct formatting or style options to be enabled or disabled altering the presentation of the email.

For example, email 320 is composed of tags and text entries. Tags typically indicate a specific process to be applied to the text entry following. Tags typically come in pairs having a start and end format. Markup tag 322 begins the email, with a closing, end markup tag 324. In this example other elements of an email are not shown, such as delivery information. A body tag 326 indicates the beginning of the body of the email while end body tag 328 signals the completion of the body content. Text entries 338, 340, 342 and 344 are the actual content of the email of interest to a user.

In these examples, "begin tag 1" 330 is a tag representing a process to be applied to text entry 340 following. Tag "end tag 1" 332 represents the end of the processing requested for text entry 340 and is paired with "begin tag 1" 330 to form a tag pair. Tags for "begin tag 2" 334 and "end tag 2" 336 operate in a similar manner on "text entry" 344.

Tags such as "begin tag 1" 330 and end tag 1" 332 may be used to create annotated portions of an email. The begin tag may indicate the start of special processing for the following text entry, while the end tag stops such processing from affecting the next text segment. Further the tags may be established to enable selective processing. In one instance a tag when parsed by a first parser, such as "1$^{st}$ parser" 350 may declare the following text to be a comment and ignored, as in the case of a hypertext markup language comment, but when processed by a second parser, such as parser 308, the tag may cause the text entry to be highlighted. Using another technique of hiding, as provided in hypertext markup language, a tag may be used to cause the text entry following to not be rendered and therefore hidden during normal processing of a 1$^{st}$ parser, but an application conditioned to use the same tag by a second parser, such as parser 308, would process the text entry in a different application specific manner. The use of hiding is commonly associated with forms processing, where information is hidden from view but passed to an application for subsequent processing.

With reference now to FIG. 4, a typical structure of a tag as may be used in an email of FIG. 3, is shown in accordance with illustrative embodiments. For example, in FIG. 3, "begin tag 1" 330 and "end tag 1" 332 may be used to define a hidden property of the associated text entry 340. Tag structure 400 is delimited by an open and closing angle bracket, indicating a start and end tag of the pair of tags as is common practice in hypertext markup language and shown in the combination of markup tag 322 and end of markup tag 324. Field 402 defines the type of tag, in this case an input control type. Field 404 having a value of "hidden" indicates nothing will appear when parsed and rendered by the hypertext markup language based browser. The name field 406 contains an identifier that is passed to a receiving application. The identifier is typically specific to the application that will use the associated data. The application is responsible for processing the corresponding value carried in value field 408.

Implementation of a tag in accordance with a hidden attribute allows for the data to be passed through the parser of the browser to a receiving application, such as an email client. The email client then may process the passed values as required and supported by the tag library and tag processor of the client application. In another example, tags used to provide hypertext markup language comments may be used to provide direction to an application while not being processed by a browser.

With reference now to FIG. 5, a portion of an email, as in FIG. 3, in accordance with illustrative embodiments is shown. A portion of a hypertext markup language email 500, as may be found in an email, such as that of FIG. 3, is illustrated. The email itself contains additional elements not shown in the example, such as header information. The email portion typically is delimited by a start tag and end tag as is the usual hypertext markup language form. The start and end "HTML" tags 502 indicate the boundary of the email content and usage of hypertext markup language, while the start and end body tag 504 indicate the actual content container. The text 506 comprises the actual textual matter of the example email. Text 506 is composed of multiple elements, some of which correspond to text entries and while other entries are tags describing the associated text entries.

The changed or modified portion of the text is indicated by change area 508 that contains hypertext markup language comment tags, creating an annotated portion of the email. The string of comment tags is further shown in respective sets of comment tags. Each tag use typically requires a start tag and end tag pair, as used in the first addition 510 of the word "is." Another pair of tags, this time delete 512, is used to indicate the deletion of the letter "s" from the existing word "jump." The last change is a second addition 514, adding the ending of "ing" to the previously modified word "jump."

The changes just made, in accordance with the tags added as comments, would be ignored by the hypertext markup language parser, as a first parser, of a browser. Comments would be passed to the email client application for processing. When the email client has processing enabled for comment tags, as in this example, the tags would be parsed, by a second parser, then processed and a receiver or user, made aware of the changes in combination with the original material. When the email client has not enabled processing for comments, the receiver would only see the final form of the email and not be aware changes had been made.

With reference now to FIG. 6, a flowchart of editing an email in an email change tracking process in accordance with illustrative embodiments is shown. Process 600 is an example of an email application process, such as that of email client 304 of FIG. 3, in accordance with illustrative embodiments of the present invention.

Process 600 begins (step 602) and receives an email for processing (step 604). A determination is made whether the email is to be edited or forwarded (step 606). If the result of step 606 is "no", process 600 skips ahead to send the email "as is" in a forward operation (step 614) and terminates thereafter (step 616). If the result of step 606 was a "yes", a determination of whether change tracking is desired is made (step 608). If the result of step 608 is "no," a portion of the email is selected for modification and the change made (step 618). Process 600 moves to send the email (step 614) and terminates thereafter (step 616).

If the result of step 608 was "yes," change tracking is to be used and a portion of the email is selected for modification and the change made (step 610). The changes made to the email are annotated (step 612). Annotation provides an indication of what was changed and where the changes occurred within the string of text entries in the email. For example, the annotation of the modified portion would include the start and end forms of the tag used to apply specific processing to the marked portion of text of the email. Process 600 then sends the email with modifications and annotations to the desired recipient (step 614) and terminates thereafter (step 616).

With reference now to FIG. 7, a flowchart of receiving an email change tracking process in accordance with illustrative embodiments is shown. Process 700 is an example of an email application process, such as that of email client 304 of FIG. 3, in accordance with illustrative embodiments of the present invention.

Process 700 begins (step 702) and receives an email in which annotated modifications may or may not be present (step 704). The email is parsed in the usual manner by a first parser, typically a client based browser (step 706). A determination is made whether the email contains "hidden fields", as defined in tag structure 400 of FIG. 4 or comment tags as in FIG. 5, indicating the presence of annotated modifications (step 708). Other types of fields may be used as well, such as the comments example just presented, provided the tags have a property that the first parser ignores the fields.

If no hidden fields are present in the email, a "no" is obtained in step 708, otherwise hidden fields are present and a "yes" is obtained. Having determined a "yes" in step 708, the hidden field value is passed along to the application, in this case, the email client application 304 of FIG. 3 for processing (step 710). A determination is made whether the application has change tracking set on (step 712).

A user or application profile may be used to set initial condition of change tracking on or off. Subsequent determination could be made as well as prompting a user to change the setting during application use. Setting may be changed to allow selective enablement according to sending user, email topic, email priority or receiving user allowing flexibility in email processing.

If change tracking is set off, a "no" result is obtained from step 712, otherwise change tracking is set on and a "yes" result is obtained. If the result of step 712 is a "yes" the application then parses the hidden field and the data carried in the tag. Tag processing is performed according to the capability of the tag processor and tag library of the application (step 714). If the result of step 712 was "no" then process 700 would skip step 714.

A result of the application processing the tag comprising hidden fields is then displayed (step 714) with process 700 terminating thereafter (step 716). If the result of step 708 was "no", process 700 would move directly to step 714 without a need for application processing, as in the current case.

Thus, the illustrative embodiments provide a capability to mark changes in a modified email using tagging. The tagging may be defined to be transparent to the usual browser parsing and processing, while passing the tags and data to a downstream application, such as an email client. The email client, then selectively enables the tag processing to render the email, complete with annotated changes, allowing a user to see the email and be aware of changes made to the original version. When tag processing is not enabled, the email client functions in the current manner. Tags used may be defined for application specific purposes provided they have the attribute of browser transparency.

The email change tracking may be selectively enabled through a set of controls. The set of controls typically including a user interface control, user profile, email profile, an application type and a configuration file to allow for the previously described tag processing to be activated when required. The user interface control may be in a number of differing forms comprising, an icon or button, by command in voice or typed input, by user or email profile, configuration file or by application type. The control allows a user to determine the desired behavior when viewing an email in accordance with illustrative embodiments of the present invention.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable recordable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for email change tracking, the computer implemented method comprising:
   receiving an email having a change tracking annotation defining an annotated portion within the email to form a received email, wherein the received email includes a set of tags comprising start and end tags defining an annotated portion, wherein the tags of the annotated portion comprise tags from a set of comment tags;
   parsing the received email with a first parser, the first parser ignoring the annotated portion to form a parsed first portion and wherein the tags of the annotated portion are ignored by the first parser;
   parsing the annotated portion of the received email with a second parser capable of parsing the annotated portion to form a parsed annotated portion, wherein the tags of the annotated portion are parsed by the second parser; and
   displaying the received email, comprising the parsed first portion and the parsed annotated portion, wherein the parsed annotated portion includes email change tracking indicating changes in a text that occurred at each location of each text change to a user.

2. The computer implemented method of claim 1, wherein parsing the received email with a second parser comprises:
   selectively and programmatically enabling the capability of the second parser to parse the annotated portion.

3. The computer implemented method of claim 2, wherein selectively and programmatically enabling further comprises:
   selection through a set of controls, the controls managing selective and programmatic enablement according to a set of criteria comprising sending user, email topic, email priority and receiving user.

4. The computer implemented method of claim 1, wherein the first parser is a hypertext markup language aware browser and the second parser is an email client.

5. The computer implemented method of claim 1, wherein displaying the received email comprising the parsed first portion and the parsed annotated portion, wherein the parsed annotated portion includes email change tracking indicating changes in a text that occurred at each location of each text change further comprises:
   processing each of the first parsed portion and the parsed annotated portion to produce a respective result;
   combining the respective result of the parsed annotated portion in-line with the respective result of the first parsed portion to form a combination; and
   displaying the combination.

6. The computer implemented method of claim 1, wherein the comment tags are located in a block of text adjacent to modified text indicating where each change occurred in the block of text.

7. The computer implemented method of claim 1 wherein the tags of the comment tags further comprise an add tag in a first http comment tag and an enclosing add tag in a second http comment tag in which the add tag and the enclosing add tag indicate that text between the http comment tags of the add tag and the enclosing add tag is text that was added to a block of text.

8. The computer implemented method of claim 1 wherein the tags of the comment tags further comprise a delete tag and an enclosing delete tag in an http comment tag in which the delete tag and the enclosing delete tag indicate that text between the delete tag and the enclosing delete tag is text that was deleted from a block of text.

9. A data processing system for email change tracking, the data processing system comprising:
   a bus;
   a memory connected to the bus;
   a persistent storage connected to the bus, wherein the persistent storage contains computer executable instructions thereon;
   a display connected to the bus;
   a communications unit connected to the bus; and
   a processor unit connected to the bus, wherein the processor unit executes the computer executable instructions to:
   receive an email having a change tracking annotation defining an annotated portion within the email to form a received email, wherein the received email includes a set of tags comprising start and end tags defining an annotated portion, wherein the tags of the annotated portion comprise tags from a set of comment tags;
   parse the received email with a first parser, the first parser ignoring the annotated portion to form a parsed first portion portion and wherein the tags of the annotated portion are ignored by the first parser;
   parse the annotated portion of the email with a second parser capable of parsing the annotated portion to form a parsed annotated portion, wherein the tags of the annotated portion are parsed by the second parser; and
   display the received email comprising the parsed first portion and the parsed annotated portion, wherein the parsed annotated portion includes email change tracking indicating changes in a text that occurred at each location of each text change to a user.

10. The data processing system of claim 9, wherein the processor unit executes the computer executable instructions to parse the received email with a second parser comprises:
    a capability of selectively and programmatically enabling the capability of the second parser to parse the annotated portion.

11. The data processing system of claim 10, wherein the capability of selectively and programmatically enabling further comprises:
    a capability of selection through a set of controls, the controls managing selective enablement according to a set of criteria comprising sending user, email topic, email priority and receiving user.

12. The data processing system of claim 9, wherein the first parser is a hypertext markup language aware browser and the second parser is an email client.

13. The data processing system of claim 9, wherein the processor unit executes the computer executable instructions to display the received email comprising the parsed first portion and the parsed annotated portion, wherein the parsed annotated portion includes email change tracking indicating changes in a text that occurred at each location of each text change further comprises:
    processing each of the first parsed portion and the parsed annotated portion to produce a respective result;
    combining the respective result of the parsed annotated portion in-line with the respective result of the first parsed portion to form a combination; and
    displaying the combination.

14. The data processing system of claim 9, wherein the set of comment tags are located in a block of text adjacent to modified text indicating where each change occurred in the block of text.

15. A computer program product for email change tracking, the computer program product comprising a computer usable recordable type medium containing computer executable program code tangibly embodied thereon, the computer executable program code comprising:
    computer executable program code for receiving an email having a change tracking annotation defining an annotated portion within the email to form a received email, wherein the received email includes a set of tags comprising start and end tags defining an annotated portion, wherein the tags of the annotated portion comprise tags from a set of comment tags;
    computer executable program code for parsing the received email with a first parser, the first parser ignoring the annotated portion, to form a parsed first portion, wherein the tags of the annotated portion are ignored by the first parser;
    computer executable program code for parsing the received email with a second parser capable of parsing the annotated portion, to form a parsed annotated portion, wherein the tags of the annotated portion are parsed by the second parser; and
    computer executable program code for displaying the received email comprising the parsed first portion and the parsed annotated portion, wherein the parsed annotated portion includes email change tracking indicating changes in a text that occurred at each location of each text change to a user.

16. The computer program product of claim 15, wherein the computer executable program code for parsing the received email with a second parser comprises:
    computer executable program code for selectively and programmatically enabling the capability of the second parser to parse the annotated portion.

17. The computer program product of claim 16, wherein the computer executable program code for selectively and programmatically enabling further comprises:
    computer executable program code for selection through a set of controls, the controls managing selective and programmatic enablement according to a set of criteria comprising sending user, email topic, email priority and receiving user.

18. The computer program product of claim 15, wherein the computer executable program code for displaying the received email comprising the parsed first portion and the parsed annotated portion, wherein the parsed annotated portion includes email change tracking indicating changes in a text that occurred at each location of each text change further comprises:
    computer executable program code for processing each of the first parsed portion and the parsed annotated portion to produce a respective result;
    computer executable program code for combining the respective result of the parsed annotated portion in-line with the respective result of the first parsed portion to form a combination; and
    computer executable program code for displaying the combination.

19. The computer program product of claim 15, wherein the first parser is a hypertext markup language aware browser and the second parser is an email client.

20. The computer program product of claim 15 wherein the comment tags are located in a block of text adjacent to a modified text indicating where each change occurred in the block of text.

* * * * *